(12) United States Patent
Peter et al.

(10) Patent No.: US 6,572,682 B2
(45) Date of Patent: Jun. 3, 2003

(54) SELF-CLEANING FILTER SYSTEM USING DIRECT ELECTRICALLY HEATED SINTERED METAL FIBER FILTER MEDIA

(75) Inventors: Klaus J. Peter, Natick, MA (US); Osama M. Ibrahim, Kingston, RI (US)

(73) Assignee: Rypos, Inc., Medway, MA (US)

(*) Notice: Subject to any disclaimer, the term of this patent is extended or adjusted under 35 U.S.C. 154(b) by 30 days.

(21) Appl. No.: 09/891,852

(22) Filed: Jun. 26, 2001

(65) Prior Publication Data

US 2002/0194996 A1 Dec. 26, 2002

(51) Int. Cl.$^7$ .................. B01D 29/62; B01D 35/12; B01D 39/20; B01D 53/04
(52) U.S. Cl. .................. 95/278; 95/285; 95/286; 95/115; 95/129; 95/148; 96/115; 96/130; 96/143; 96/154; 55/282.2; 55/282.3; 55/283; 55/286; 55/287; 55/288; 55/523; 55/524; 55/DIG. 30; 60/299; 60/300; 60/303; 60/311
(58) Field of Search .................. 55/282.2, 282.3, 55/283, 286, 287, 288, 523, 524, DIG. 30; 95/278, 283, 285, 286, 115, 129, 148; 96/115, 130, 143, 154; 60/299, 300, 301, 302, 303, 311; 423/212, 239.1, 239.2

(56) References Cited

U.S. PATENT DOCUMENTS

| | | | |
|---|---|---|---|
| 3,802,922 A | * 4/1974 | Meibuhr | 205/194 |
| 4,276,066 A | 6/1981 | Bly et al. | 55/287 |
| 4,419,113 A | 12/1983 | Smith | 55/484 |
| 4,505,107 A | 3/1985 | Yamaguchi et al. | 60/303 |
| 4,516,993 A | 5/1985 | Takeuchi et al. | 55/283 |
| 4,523,935 A | 6/1985 | Takagi et al. | 55/282 |
| 4,881,959 A | 11/1989 | Kono et al. | 55/267 |
| 4,902,309 A | 2/1990 | Hempenstall | 55/33 |
| 5,149,508 A | 9/1992 | Bullock | 422/174 |
| 5,207,807 A | 5/1993 | Manfre et al. | 55/269 |
| 5,228,891 A | 7/1993 | Adiletta | 55/484 |
| 5,405,422 A | 4/1995 | Ueda et al. | 55/267 |
| 5,409,669 A | 4/1995 | Smith et al. | 422/174 |
| 5,423,904 A | 6/1995 | Dasgupta | 96/146 |
| 5,443,623 A | * 8/1995 | Jonas et al. | 95/101 |
| 5,454,845 A | * 10/1995 | Anahara et al. | 55/482.1 |
| 5,457,945 A | 10/1995 | Adiletta | 55/301 |
| 5,458,664 A | 10/1995 | Ishii et al. | 55/282 |
| 5,571,298 A | 11/1996 | Buck | 55/267 |
| 5,620,490 A | 4/1997 | Kawamura | 55/267 |
| 5,682,740 A | * 11/1997 | Kawamura | 55/523 |
| 5,746,989 A | * 5/1998 | Murachi et al. | 423/212 |
| 5,853,437 A | 12/1998 | Peter et al. | 55/282.3 |
| 6,063,150 A | 5/2000 | Peter et al. | 55/282.3 |
| 6,090,172 A | * 7/2000 | Dementhon et al. | 55/282.3 |
| 6,120,583 A | * 9/2000 | Saito et al. | 55/282.3 |
| 6,174,835 B1 | * 1/2001 | Naito et al. | 423/239.1 |
| 6,176,896 B1 | * 1/2001 | Dementhon et al. | 55/282.3 |

* cited by examiner

*Primary Examiner*—Duane Smith
*Assistant Examiner*—Jason M. Greene
(74) *Attorney, Agent, or Firm*—Barlow, Josephs & Holmes, Ltd.

(57) ABSTRACT

A Diesel particulate filter cartridge system for filtering particulate matter and nitrogen oxide from a flow of air containing particular matter includes a filter support plate with a plurality of cylindrical electrically regenerable filter media members connected thereto. A NOx trap is also provided that is either incorporated directly into the filter media members or provided as a separate structure in close proximity to the filter media members. A valve assembly includes a number of independently actuatable damper valves that correspond to a number of through holes in the filter support plate. When actuated, the damper valves limiting flow of air through a corresponding through hole and filter media member connected thereto. An outer housing is disposed about the valve assembly and filter media members to contain them in a compact package. A programmable computer control module shuts off the flow of air through a filter media member and selectively electrically regenerates it. Such electrical regeneration is accomplished through heat which also, either directly or indirectly, regenerates the NOx trap.

23 Claims, 9 Drawing Sheets

SELF-CLEANING FILTER SYSTEM USING DIRECT ELECTRICALLY HEATED SINTERED METAL FIBER FILTER MEDIA

BACKGROUND OF THE INVENTION

The present invention relates generally to an electrically regenerable filter cartridge system. More specifically, the present invention relates to the regenerable self-cleaning filter cartridge system for removing carbon, lube oil and unburned fuel particulates from the exhaust of internal combustion engines. In addition, the present invention relates to a regenerable filter cartridge system for removing particulates from Diesel engine exhaust gases. Further, the present invention also relates to a trap or filter for nitrogen oxide (NOx) to convert such gases to more desirable gases and to purge the exhaust of sulfur.

In the automotive industry, there has been a tremendous concern over the introduction of harmful pollutants into the air which have been generated by vehicle exhaust. Due to the negative health effects of such emissions, the Environmental Protection Agency of the United States has expressed a desire to reduce particle emissions from internal combustion engines. In the United States, the majority of particulate emissions come from Diesel engines on trucks and buses, which have not been regulated as closely as vehicles with gasoline engines.

Various attempts have been made to decrease the particulate emissions from Diesel engines. Unlike with gasoline engine vehicles, existing catalytic converters do not work well with Diesel engines since particulates typically clog these devices since the temperatures within them are too low to effectively burn carbon, lube oil and unburned fuel particles. Other efforts have been made to specifically address the Diesel particulate emissions problem. For example, fired burner systems have been employed to heat a combustion chamber, which receives Diesel exhaust for the purpose of burning the particulates within the chamber at very high temperatures. Such combustion chambers suffer from the drawbacks of high initial cost, high complexity, large size, high-energy consumption and high maintenance cost.

Another prior art attempt is the employment of passive particle filters and configurations to trap the particulates associated with Diesel emissions. These passive particle filters are commonly made from ceramic and metal, for example. These passive particulate filters are inadequate because when the filter fills up with carbon particles, the back pressure within the exhaust increases to such a level which necessitates that the filter be either regenerated in some fashion or replaced entirely. Since replacing the filter is not practical, many types of regeneration have been attempted, including the raising of the temperature of the filter above the combustion point of the carbon particulates in similar fashion to a self-cleaning oven. These prior art methods of filter regeneration include using a fired burner assembly using some type of fuel; raising the exhaust gas temperature by turbo charging the engine or other means; reducing the ignition temperature of carbon particles by adding a suitable catalyst to the fuel or filter material; and electrical heating. The foregoing methods of filter regeneration are not typically used in vehicles today due to their associated cost and practicality.

Further, there have been prior art attempts to employ electrically regenerable filter media instead of the passive filters that need to be replaced and fired burner systems which burn off the collected particulate matter. While the prior electrically regenerable filter media is suitable for burning off collected particulate matter, there is no known complete filter media cartridge system that can accommodate selective regeneration of multiple cartridges in a single system to achieve continuous operation. Further the prior art systems are not compact and, as a result, not suitable for many vehicle applications. Moreover, existing filter media systems cannot be precisely controlled to provide customized continuous filtration. The energy consumption is very high in these prior systems.

Specifically, there are a number of products that address the problem of reducing diesel engine emissions through the use of Diesel Oxidation Catalysts (DOC). DOCs are usually constructed of a ceramic or metal substrate coated with a catalytic material. Although a DOC can reduce the Soluble Organic Fraction of the Particulate Matter, it has no effect on the carbon particles. Most systems based on catalytic oxidation achieve only in the order of 20–25% reduction in PM, the level presently approved by the EPA and which will soon be inadequate as new tougher standards are applied. Furthermore, as soot covers the surface of the catalytic converter, the catalyst quickly becomes ineffective which shortens the service life and degrades the performance of the system. Most of the systems rely on high exhaust temperature to initiate and maintain the regeneration, a factor that limits the useful range of these systems.

In the world market, many producers have emerged as key players, especially in Europe, taking advantage of the significant support from governments and diesel engine manufacturers. Currently, the European market is dominated by a few technologies, mainly variations of the ceramic substrates. The most prevalent mode of regeneration, unlike the USA market, is fuel additives. It is important to mention that the effect of such additives has not been thoroughly studied, but there are indications that perceived harmful side effects will impede their introduction to the USA market and might lead to limiting their wide spread use in Europe.

Diesel particulate filters available in today's market are typically built on a ceramic substrate that traps soot by forcing the exhaust to flow through porous walls in a monolith. A catalyst is coated on the inside surface of the monolith. This lowers the soot combustion temperature, allowing the filter to regenerate at lower temperature than the ignition temperature of soot. An inherent limitation of such systems is that they rely on high exhaust temperatures and are practically inoperable at lower temperatures. For optimal performance, these systems require that the hot duty cycle of the engine be at least 20% of its operation, some system producers specify a hot duty cycle as high as 40–50% of the engine's operation. In some driving conditions, it is difficult to maintain the necessary exhaust temperature required to regenerate this type of filter. Such a situation can cause excessive accumulation of particulate matter (soot overloading) and clogging of the filter and may later lead to uncontrolled combustion resulting in the destruction of the filter. To overcome this problem, some filters have installed electric heaters to maintain the necessary temperature for regeneration. Two regeneration strategies have developed in the market:

a. Regeneration while the engine is running, usually requiring large electric currents.

b. Regeneration while the engine is off. This is usually done after 8 engine hours, and requires plugging into an external power source, and is not convenient for normal driving conditions.

Another inherent limitation of the catalyzed ceramic filters is the fact that sulfur compounds in the Diesel fuel poison the catalysts needed to reduce the particulate matter emitted by Diesel engines.

In the prior art, it is also desirable to employ a nitrogen oxide (NOx) trap in addition to a particulate filter to improve the overall operation of the engine. Lean $NO_x$ traps operate cyclically. During the lean portion of the cycle (fill duration), $NO_x$ is adsorbed. After running lean for a period of time, the trapping efficiency becomes low and the trap must be regenerated. This is done by operating rich of stoichiometric. The hydrocarbons and CO emitted during rich operation causes the $NO_x$ to reduce to $N_2$ and $O_2$. The lean part of the cycle may typically last for one minute followed by the regeneration or purge part of the cycle for one second.

It is desirable that the transition between the fill and purge portions of the cycle be imperceptible to the driver. Accordingly, the prior art strategies provide for a relatively slow transition between the fill and purge portions of the cycle. Of the transitions that must occur, including fuel flow and spark changes, the most difficult transition is the manifold pressure change. The throttle (or other valve) must be closed rapidly to accomplish the lean to rich and rich to lean transition. Even after the throttle has attained the appropriate position, it takes a few cycles for the intake manifold to fill or to purge, depending on the transition. Thus, the transition occurs over a number of engine cycles. Because of the number of parameters which must be changed, it is a challenge to do this robustly and with no torque fluctuation. Furthermore, the ramping of the conditions which are required to get to and from the purge condition negatively impacts fuel economy. Alternatively, fuel may be separately injected into the NOx trap to supply the needed hydrocarbons for regeneration.

In view of the above, there is a demand for a low energy regenerable Diesel exhaust filter system which can successfully remove carbon, lube oil and unburned fuel particulates from the exhaust of a Diesel engine. It is also desirable for a filter system to be able to remove nitrogen oxide from the exhaust. It is also desirable that the regenerable filter system be compact and inexpensive to manufacture and use while being efficient in the field. It is desirable for a filter system to not impact the fuel economy of the engine while still providing an efficient filter system. Further, it is desirable that the filter system is reliable over long periods of time without maintenance while improving the overall performance and particle holding capacity, even at low differential pressure.

SUMMARY OF THE INVENTION

The present invention preserves the advantages of prior art electrically regenerated diesel particulate filter systems. In addition, it provides new advantages not found in currently available filter systems, and overcomes many disadvantages of such currently available filter systems.

The invention is generally directed to a novel and unique self-cleaning particle filter system with particular application in removing carbon, lube oil, unburned fuel particulates as well as nitrogen oxide from the exhaust of Diesel engines. The self-cleaning particle filter system of the present invention enables the inexpensive assembly, use and maintenance of a compact self-cleaning particle filter system for Diesel engines without detracting from the overall performance of the engine or the fuel economy thereof.

The preferred embodiment of the present invention includes a filter support plate with a plurality of cylindrical electrically regenerable filter media members connected thereto. A valve assembly includes a number of independently actuatable damper valves that correspond to a number of through holes in the filter support plate. When actuated, the damper valves limiting or reducing flow of air through a corresponding through hole and filter media member connected thereto. An outer housing is disposed about the valve assembly and filter media members to contain them in a compact package. A programmable computer control module shuts off the flow of air through a filter media member and selectively electrically regenerates it.

The filter system also preferably includes a NOx trap as well that takes advantage of the electrically regenerable particulate filter employed in the system. The NOx trap portion of the present invention may be in the form of a wash coat of the appropriate chemical composition, such as barium oxide) on the downstream side of the electrically regenerable filter media. As a result, the NOx trap is directly heated simulataneously while the filter media is being regenerated for removal of particulate matter trapped thereon. Also, hydrocarbons, in the form of unburned fuel, are supplied to the NOx trap layer on the filter media since it is in line with the exhaust which inherently traps excess hydrocarbons. Thus, the regeneration of the NOx layer and the removal of sulfur is facilitated without the need for the separate injection of hydrocarbons or separate heating source for the NOx trap.

In accordance with the method of the present invention, a filter support plate is provided with a plurality of through holes along with a number of cylindrical filter media members, each having a bottom closed end and a top open end. The cylindrical configuration has an outer surface defining an upstream side and an inner surface defining a downstream side with the top open end of each of the filter media members being connected to the filter support plate with the top open end of each of the filter media members in respective fluid communication with the through holes. A NOx trap chemical layer, such as barium oxide, is coated on the downstream side of the filter media. Alternatively, a separate NOx filter member, infused with barium oxide or the like, may be provide in communication with the downstream side of the filter media member. A valve assembly is provided with a number of damper valves connected thereto. Air, containing particulate matter therein, is passed through the filter media members so that particulate matter is collected in the filter media members. One of the damper valves is actuated into communication with its corresponding through hole thereby reducing flow of air through a corresponding filter media member connected thereto. Electricity is passed through the filter media member with reduced airflow therethrough. The filter media member, with reduced airflow therethrough, is regenerated. The NOx trap material, either directly coated to the filter media or in a separate filter member, is also regenerated with the assistance of the electrically generated heat as well as the hydrocarbons from the unburned fuel trapped by the filter media. To allow for resumed use of the now regenerated filter media member, its corresponding damper valve is actuated out of communication with its corresponding through hole thereby allowing full flow of air through the corresponding filter media member connected thereto.

It is therefore an object of the present invention to provide an improved Diesel exhaust filter system.

Another object of the present invention is to provide a Diesel exhaust filter cartridge with is electrically regenerated with a minimum amount of energy.

A further object of the present invention is to provide a Diesel exhaust filter system that also includes an integrated NOx trap that does not require the injection of additional hydrocarbons or separate heating supply.

It is a further object of the present invention to provide an exhaust filter, which is reliable over long periods of time without maintenance.

It is yet a further object of the present invention to provide a Diesel exhaust filter, which has improved overall performance and increased particle-holding capacity at low differential pressure.

It is another object of the present invention to provide a Diesel exhaust filter, which efficiently removes carbon, lube oil and unburned fuel particles from the exhaust of internal combustion engines.

It is yet a further object of the present invention to provide a low cost Diesel exhaust filter with improved manufacturability.

It is another object of the present invention to provide a filter cartridge system that achieves continuous operation.

A further object of the invention is to provide a filter cartridge system that is compact.

Another object of the present invention is to provide a filter cartridge system that is computer controlled to efficiently use an array of filter media cartridges.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
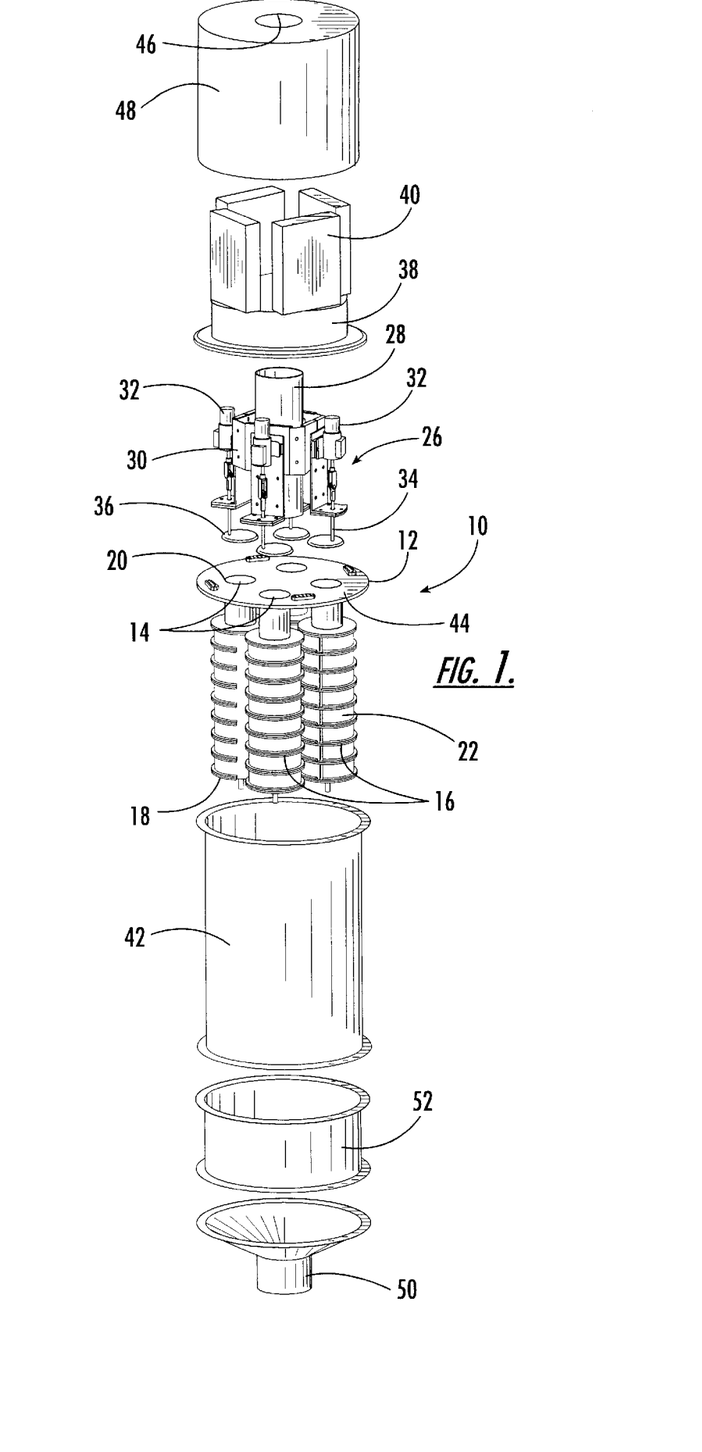
FIG. 1 is an exploded perspective view of the filter cartridge system of the present invention.

Referring first to FIG. 1, the exploded perspective view of the filter cartridge assembly 10 of the present invention is shown to include a filter support plate 12 with a number of apertures 14 therethrough. A number of corresponding filter media members 16 downwardly depend from the filter support plate 12. In particular, an array of filter media members 16 are, preferably, generally cylindrical in configuration with a closed bottom end 18 and an open top end 20. Details of the construction of a filter media member 16 is discussed in detail below in connection with FIGS. 5–7.

Figure 7:
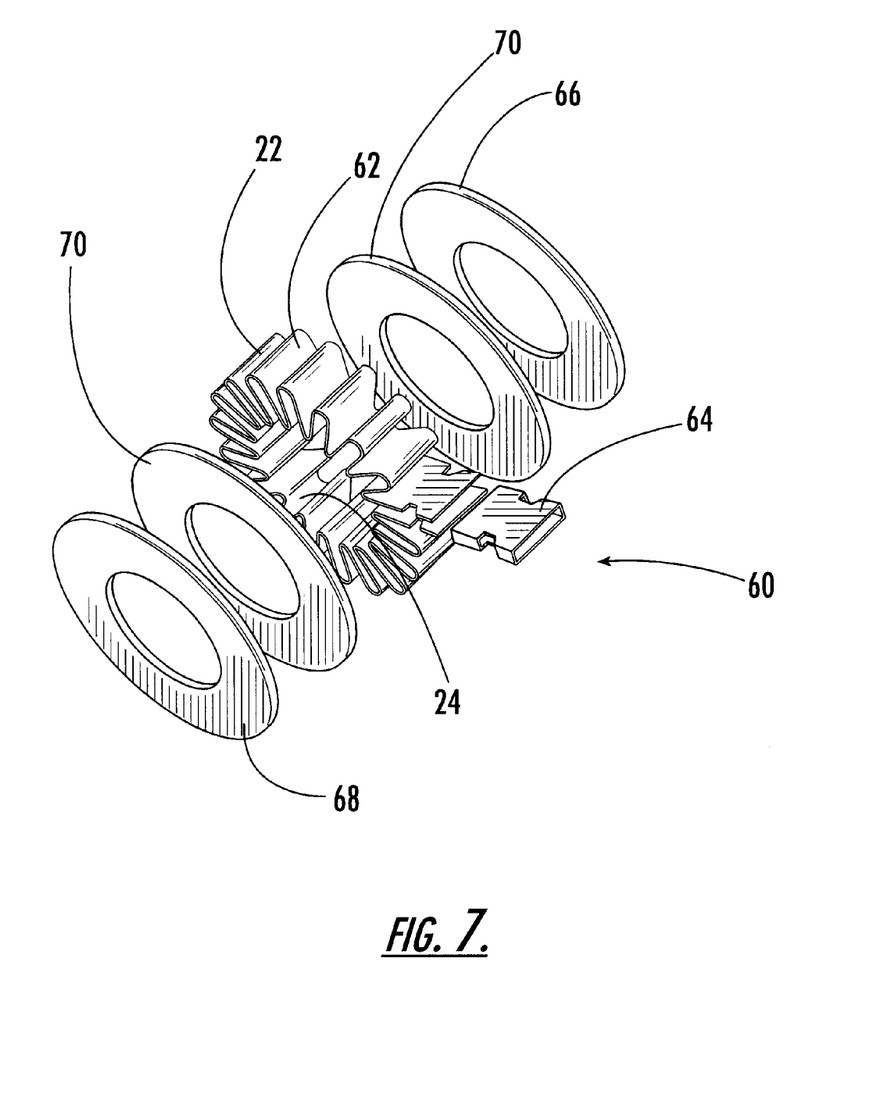
FIG. 7 is an exploded perspective view of a sub-cartridge employed in the filter cartridge of FIG. 5.

Each of the filter media members 16 are connected to the filter support plate 12 so that the open top ends 20 of each of the filter media members 16 align with their corresponding apertures 14 through the filter support plate 12. They are affixed in place by welding, or the like. Further, each of the filter media members 16 include an outer upstream surface 22 as well as an inner downstream filter surface 24, as seen in FIG. 7. The interior or downstream surface 24 of each of the cylinder configurations of the filter media members 16 are in fluid communication with the apertures 14 through the filter support plate 12. As will be discussed in detail below, the flow of air, with particulate matter therein, flows in an upward direction in accordance with the orientation of the system 10 shown in FIG. 1.

A valve assembly, generally referenced as 26, is provided to control the air flow through each of the apertures 14 in the filter support plate 12, thereby controlling the flow through each of the filter media members 16 respectively connected thereto. In particular, the valve assembly 26 includes a central mounting tube 28 with a main frame 30 having a corresponding number of actuatable piston cylinders 32 attached thereto. Each of these piston cylinders 32 include a rod 34 downwardly depending therefrom with a damper plate 36 disposed at each respective free end. The number of piston cylinders 32 and damper plates 36 are selected to match the number of apertures 14 in the filter support plate 12 and the number of corresponding filter media members 16. As will be shown below in connection with FIG. 3, the flow of air through a given filter media 16 member may be selectively controlled by actuating a damper plate 36, otherwise known generally as a damper valve, into communication with an aperture 14 through the filter support plate 12 to permit the corresponding filter media member 16 to be regenerated by the passage of electricity therethrough.

A cylindrical base 38 is also provided for supporting electronic computer control circuitry, generally referred to as a computer control module 40, which can control, through programming, a selective flow control of air through the filter media members 16 as well as the electric regeneration thereof. Details of the computer control module 40 is not discussed in detail herein because such computer control is well known in the art.

Figure 2:
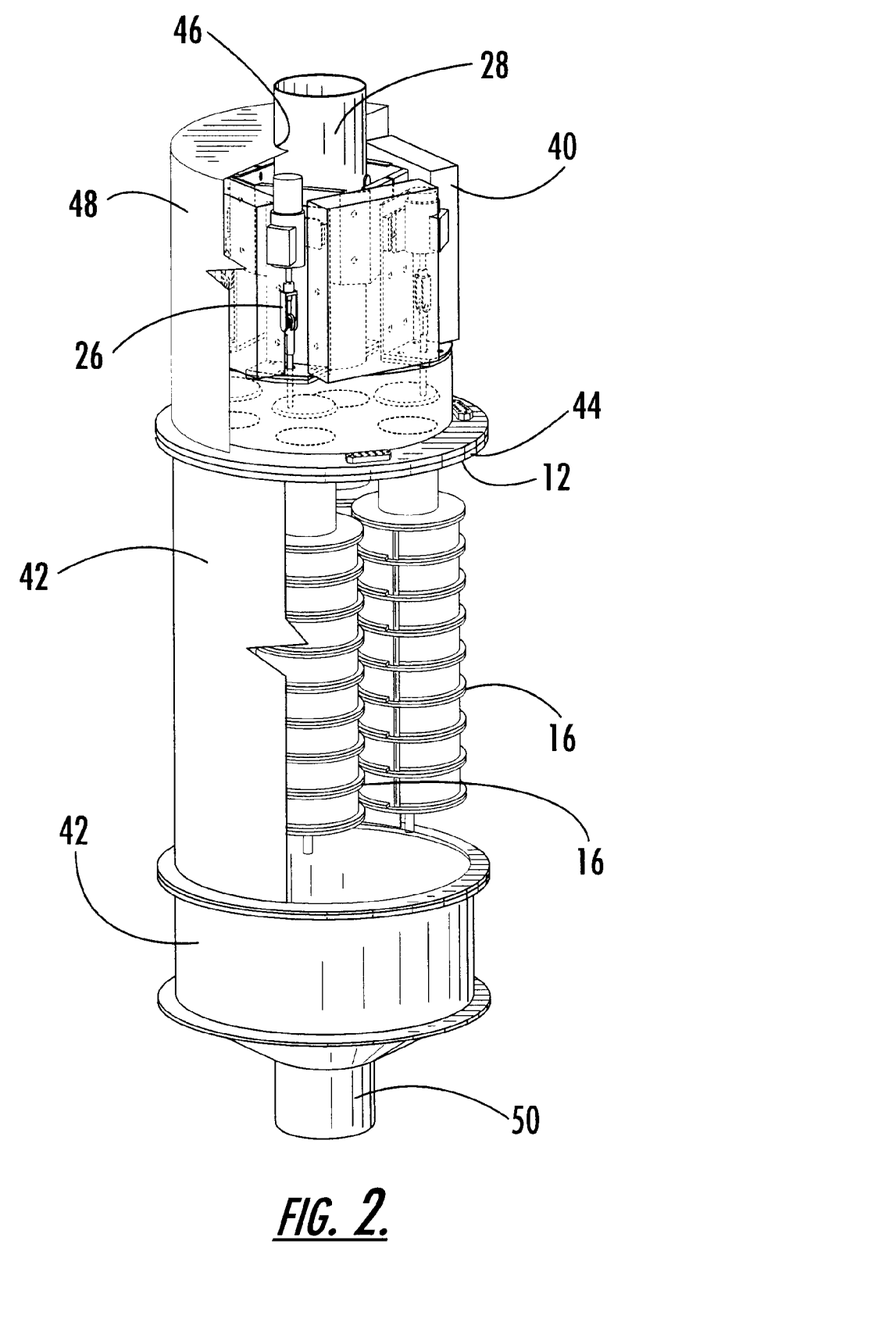
FIG. 2 is the filter cartridge system in an assembled condition.

Referring now to FIGS. 1 and 2, the assembly of the filter cartridge system 10 is illustrated. In particular, the filter support plate 12 and the filter media members 16 connected thereto reside within a main sleeve 42 so that the outer edges 44 of the filter support plate 12 rest on the top edge of the main sleeve 42. As seen in FIG. 2, the filter media members 16 are housed securely within the main sleeve 42. The cylindrical base 38, with electronic computer control module 40, which may include more than one component as shown, disposed thereon, resides on the outer edges 44 of the filter support plate 12 so that the valve assembly 26 extends through the center of the base 38. The cylindrical mounting tube 28 of the valve assembly 26 extends upwardly through the support base 38 and is subsequently routed through the exit port 46 of a top cap 48 which seals and protects the valve assembly 26 and electronic computer control module 40 therein.

In addition, an input port 50, of a preferably funnel-shape, is affixed to the lower open end of the main sleeve 42 via a spacer sleeve 52. These components may be secured in place by welding, soldering, riveting, threaded fasteners, or the like. As a result of this configuration, air flow, with particulate matter therein, flows in through the input port 50, through the spacer sleeve 52, and into each of the filter media members 16 from their outer upstream surfaces 22 and into the interior of the cylindrical filter media members 16 to exit out their respective apertures 14 in the filter support plate 12 if a damper plate 36 is not engaged with the corresponding aperture 14 in the filter support plate 12. If the damper plate 36 is open, air will flow freely through the central mounting tube 28 to exit out of the top cap 48 via the exit port 46.

Figure 3:
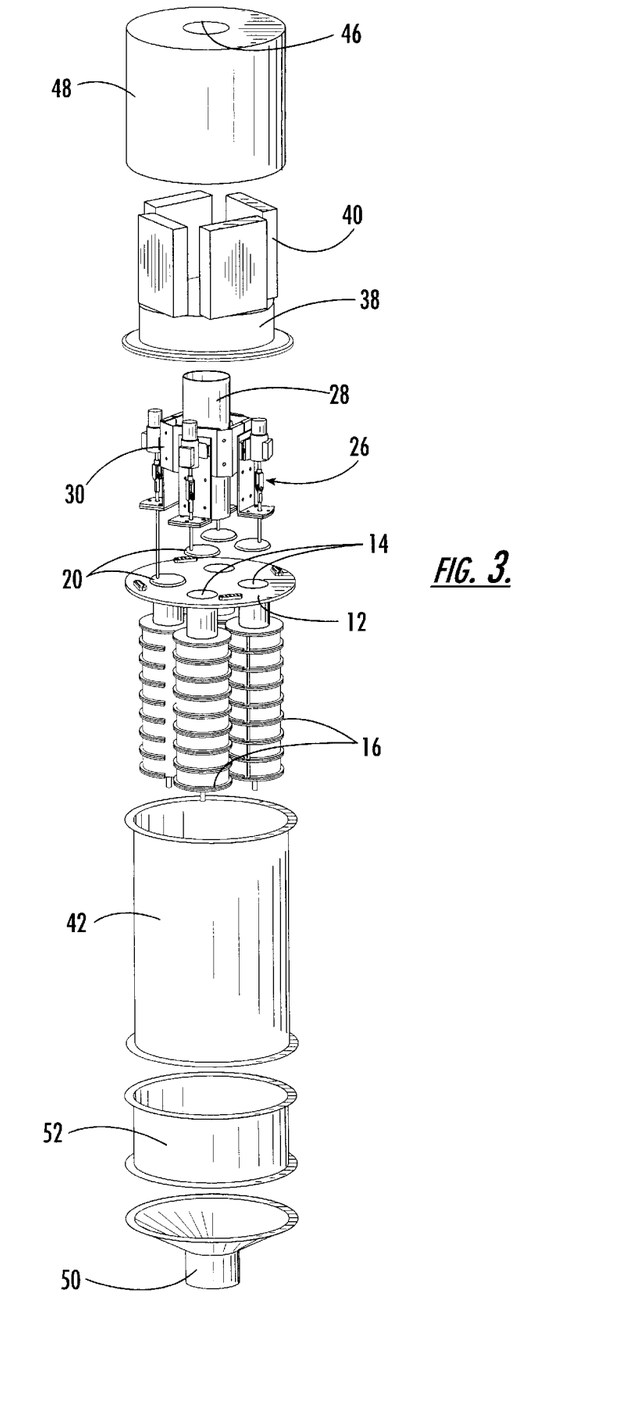
FIG. 3 is a exploded perspective view of the filter cartridge system of FIG. 1 with one damper valve closed to enable regeneration of its corresponding filter media member.
Figure 4:
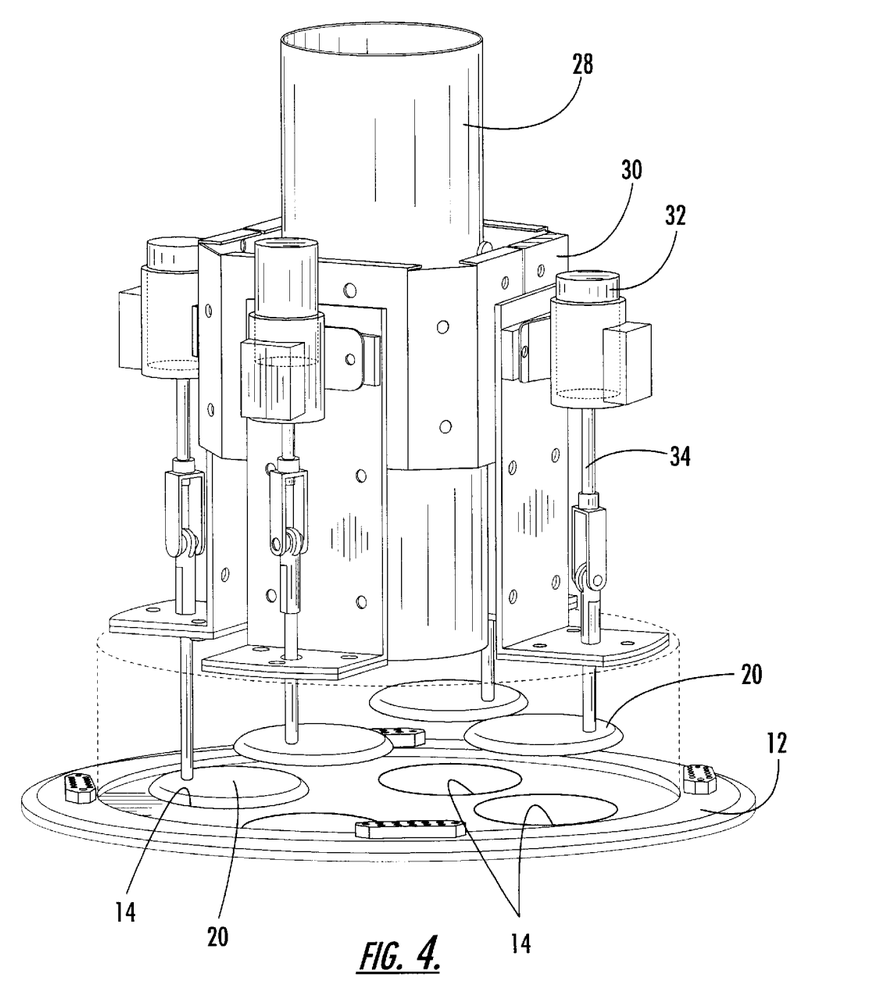
FIG. 4 is a close-up perspective view of the valve assembly and filter plate arrangement.

Turning now to FIGS. 3 and 4, details of the operation of the filter cartridge system 10 of the present invention, is shown. As stated above, each of the filter media members 16 are mounted to the filter support plate 12 so that air can flow through the filter media members 16 and through their respective apertures 14 in the filter support plate 12. The filter cartridge system 10 of the present invention can easily replace known vehicle filtration systems, including mufflers and catalytic converters, In that connection, when the filter cartridge system 10 of the present invention is placed in line with the exhaust of a vehicle, such as the exhaust of a diesel truck, air flows through the input port 50, through the filter media members 16, and out through the exit port 46 in the top cap 48. Typically, diesel exhaust includes various particulate matter, such as soot, and the like. This particulate matter must be filtered to reduce emissions and comply with environmental guidelines and regulations. As a result, the filter cartridge system 10 of the present invention can be employed to comply with such government regulations and guidelines.

As can be understood, the passing of air with particulate matter through the filter media members 16 will cause the filtered particulate matter to be collected on the surfaces and within the filtered media members 16 themselves. Further, collection of particulate matter will eventually reduce the air flow and pressure through the exhaust line thus necessitating some type of regeneration and cleaning of the filter medial members. In accordance with the present invention, the filter media members 16 are selectively electrically regenerated and cleaned as desired. For example, in accordance with the present invention, it is preferred that four filter media members 16 be used where a single filter media member 16 is regenerated and cleaned at a time. FIGS. 3 and 4 illustrates the electrical regeneration and cleaning of the left-most filter media member 16.

First, the flow of air and particulate matter through this filter media member 16 is shut off or significantly dampened by the actuation of its corresponding damper plate 20 into communication with the corresponding aperture 14 in the filter support plate 12. With the damper plate 20 in its closed position, flow through the left-most filter media member 16 will be, essentially, cut off. The complete cut-off of air with a perfect seal is typically unnecessary as long as the rate of regeneration exceeds the rate of accumulation of particulate matter on the filter media member. In certain applications, a complete cut-off of air flow may be desired thus requiring additional seals, and the like, to ensure such a complete cut-off of air flow. Also, while a better seal is desired, it is not always necessary to carry out the present invention. However, as shown in the drawings, a perfect seal is not illustrated.

With the damper plate 20 engaged and the air flow through the corresponding filter media member 16 significantly reduced or cut-off, that particular filter media member 16 can now be electrically regenerated and cleaned. The computer control module 40 is electrically interconnected to the filter media member to regenerated. The computer control module 40 is pre-programmed to set a given cycle of damper valve actuations and electrical regeneration of the respective filter media members 16 in accordance with the particulate application at hand, namely, the particular vehicle in which the filter cartridge system 10 is installed. For example, a typical routine that can be easily programmed into the electronic computer control module 40 is for each damper plate 20 to close for a period of 60 seconds while the other damper plates 20 stay open. During this time, the corresponding filter media member 16 is electrically regenerated and cleaned. Then, another damper plate 20 for another filter media member 16 is actuated downwardly while keeping the other damper plates 20 open to repeat the cycle.

While it is preferred that a single damper plate or valve 20 be actuated and a single filter media member 16 be electrically regenerated and cleaned at a time, certain applications may require that more than one filter media member 16 be regenerated at a time. Also, the preferred embodiment of the present invention includes four filter media members 16. However, certain applications may require less or more filter media members 16 to address the particular needs of the vehicle into which the filter cartridge system is installed. As a result, the number of corresponding damper plates 20 and apertures 14 in the filter support plate 12 can be modified accordingly.

The present invention illustrates the use of cylindrical filter media members 16 as a preferred embodiment of the present invention; however, the shape and configuration of the filter media members 16 may be modified to suit the particular application at hand. For example, the filter media members 16 may be plate-like in configuration, or otherwise.

Figure 5:
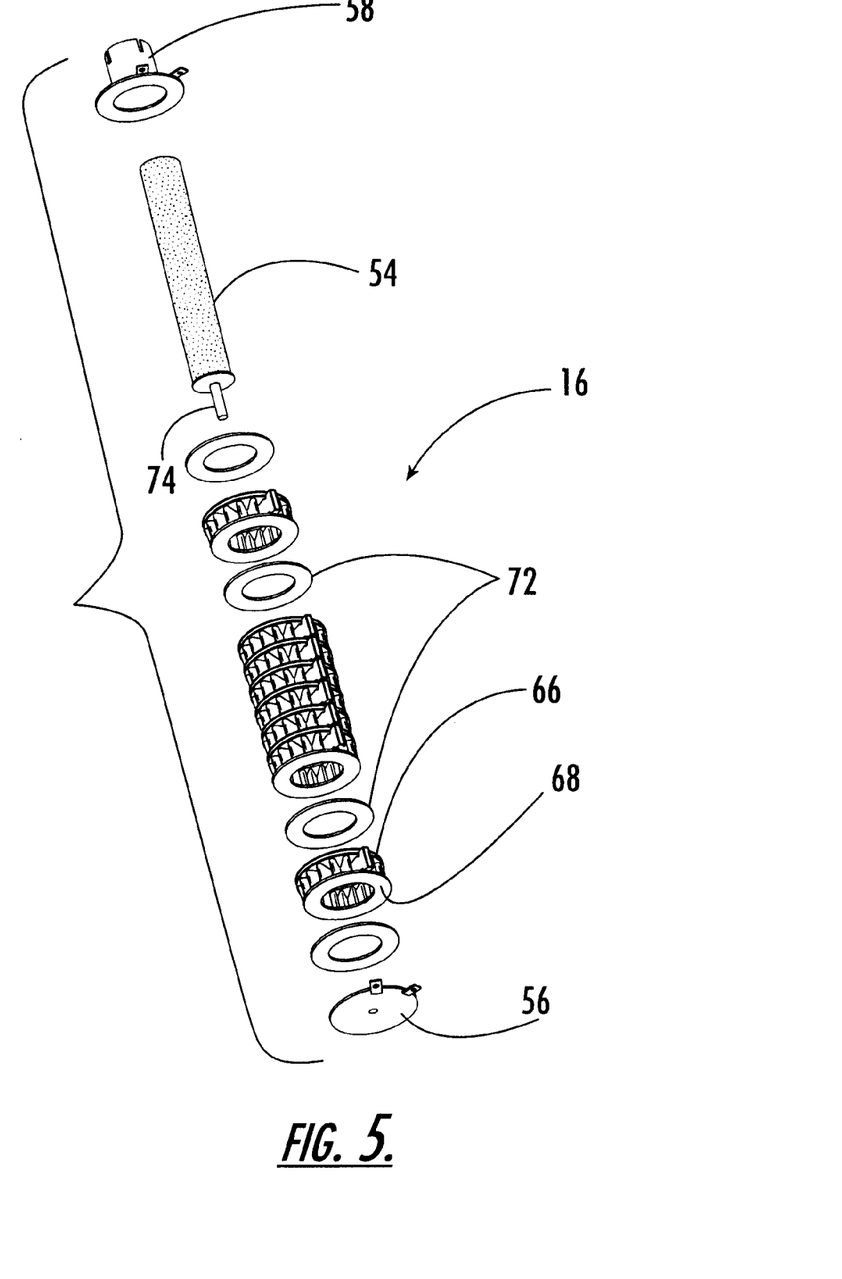
FIG. 5 is an exploded perspective views a preferred filter cartridge member with a number discrete sub-cartridges.
Figure 6:
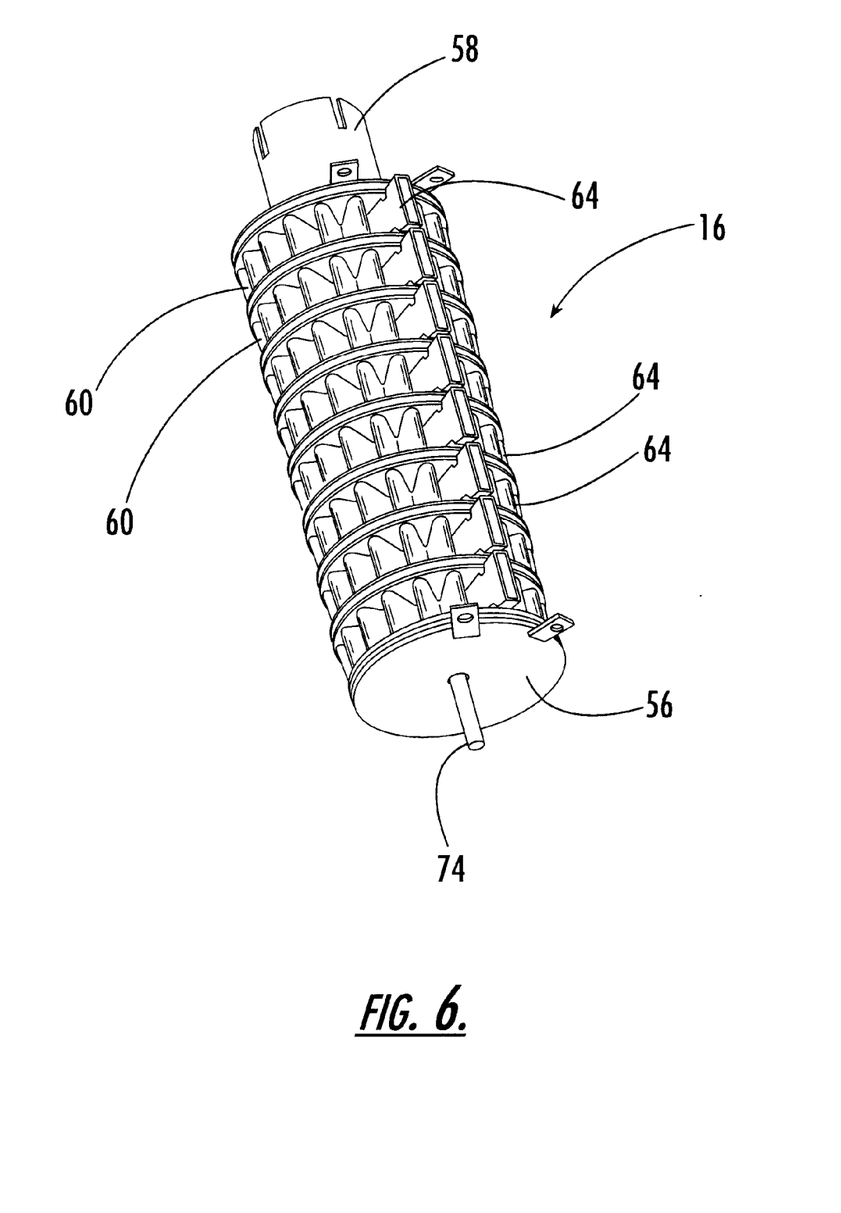
FIG. 6 is a perspective view of the filter cartridge of FIG. 5.

FIGS. 5–7 further illustrate the details of the particular construction of the preferred construction for the filter media member 16. Referring to both FIGS. 5 and 6, a central perforated metal carrier tube 54 is provided with a closed bottom end plate 56. A top interface cap 58 is provided for engagement with the bottom of the filter support plate 12 at a respective aperture 14 therethrough. The preferred construction of the filter media member 16 of the present invention is modular in construction where a number of different sub-cartridges 60 are provided within a given filter media member 16. While this is not required to carry out the present invention, it is preferred for additional flexibility and control of the regeneration and cleaning process. In particular, the filter media member 16 has, for example, eight modular sub-cartridges 60 which are illustrated in detail in FIG. 7. Each of these sub-cartridges 60 include filter media 62 in a corrugated configuration for example, as well as electrical interconnections 64 for interface to the electronic computer control module 40. It is preferred that each of the separate sub-cartridges 60 within a filter media member 16 are independently connected to the electronic computer control module 40 for independent and separate control. Each of the sub-cartridges 60 also include a top cap 66 and a bottom cap 68 with insulative material 70 adjacent to the corrugated filter media 62. Spacer washers 72 are also provided between each adjacent sub-cartridge 60. The bottom end plate 56 is also provided to secure the sub-cartridges 60 in a stack on the perforated metal support tube 54 via a post 74 extending downwardly therefrom.

FIG. 6 illustrates a perspective view of an assembled filter media member 16 in accordance with the present invention. As a result, each of the sub-cartridges 60 include their own individual and distinct electrical interconnections 64 for interfacing with the electronic computer control module 40. Each of the sub-cartridges 60 include two inner connections 64 for providing electric current thereto. Details of the electrical interconnections are shown in FIG. 7. In FIG. 7, one interface connector 64 is shown connected to one end of the filter media 62 for illustration purposes. A third common line is also provided for grounding purposes and may be connected to the bottom end plate 56 or the top cap portion 58 of the filter media member 16. In view of the foregoing, each of the individual sub-cartridges 60, namely the electrical regeneration and cleaning thereof, can be controlled by the programmable electronic computer control module 40.

Figure 8:
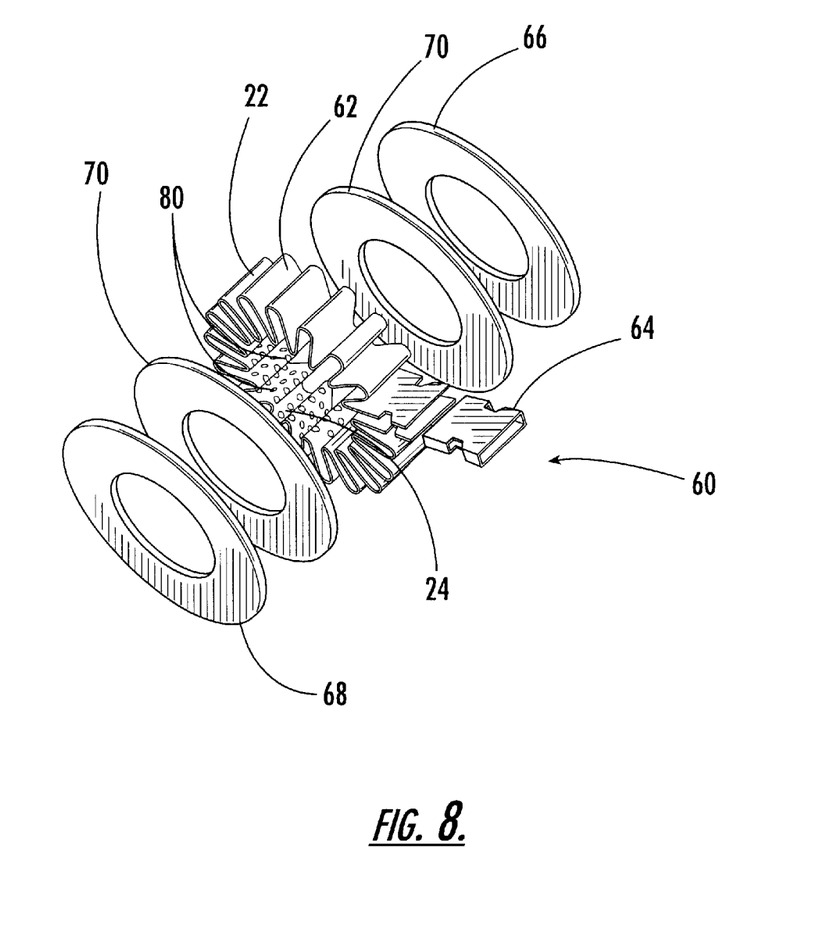
FIG. 8 is an exploded perspective view of a sub-cartridge employed in the filter cartridge of FIG. 5 with additional wash coat NOx trap.
Figure 9:
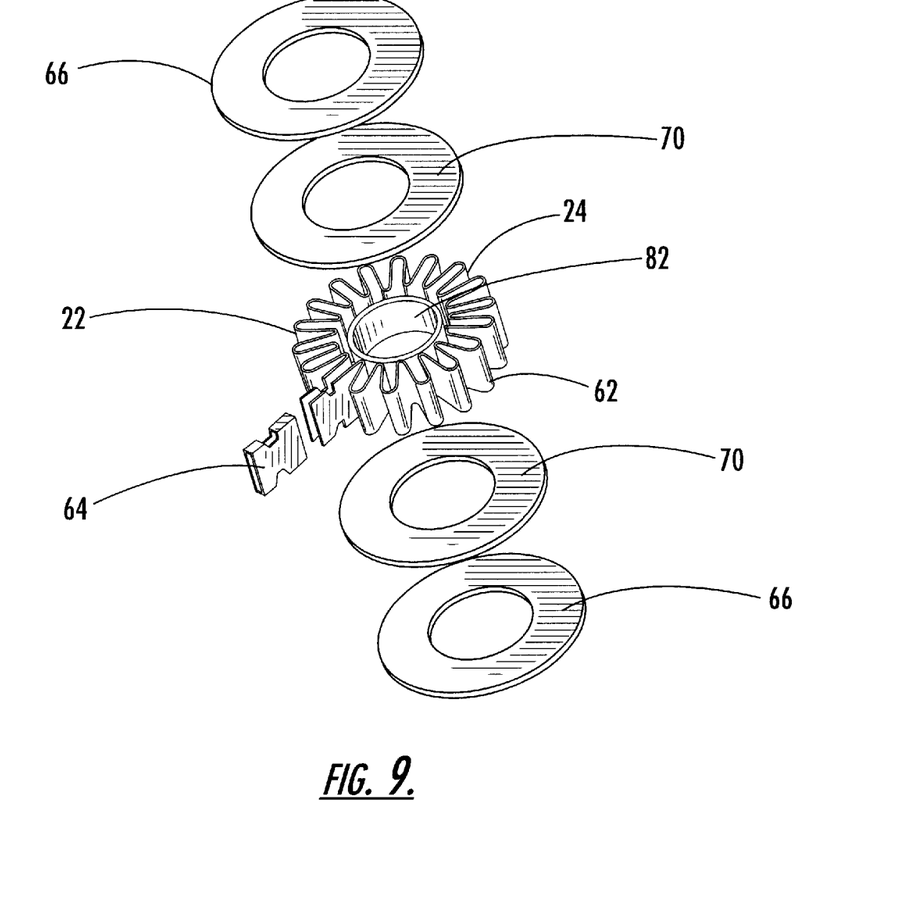
FIG. 9 is an exploded perspective view of a sub-cartridge employed in the filter cartridge of FIG. 5 with additional NOx trap member.

As shown in FIGS. 8 and 9, an additional nitrogen oxide (NOx) trap may be provided in addition to the particulate filter describe above. In accordance with the present invention, a NOx trap is integrated directly within the existing particulate filter system shown in FIGS. 1–7. The NOx trap takes advantage of various existing features and characteristics of filter system 10 to carry out the NOx trap functionality.

As shown in FIG. 8, a filter sub-cartridge 60 is provided with a NOx trap incorporated directly into the filter element. Specifically, the NOx trap is formed by applying a wash coat of the appropriate chemical composition, such as barium oxide, to the downstream surface 24 of the filter media 62. The wash coat is generally referenced as 80. During Diesel particulate regeneration, the NOx trap wash coat 80 is exposed to direct heating by electrical current applied to the filter media 62 via electrical interconnections 64. The electric current raises the temperature of the filter elements to about 800–900 deg. C. To reduce total energy requirements, an exhaust flow control reduces the flow through filter element to be regenerated. The process of heating and burning Diesel particulate on the filter element 64 produces hydrocarbons and carbon monoxide needed to regenerate the NOx trap otherwise known as the wash coat 80. The temperature reached during the electric regeneration is sufficient to purge the NOx trap of sulfur.

A further construction for integrating a NOx trap within the filter media construction 10 of the present is shown in FIG. 9. Specifically, an additional band 82 of material similar or identical to filter media 64 is provided of, for example, sintered metal fibers to provide a NOx trap member. Configurations other than a band shape can be used to suit the application at hand. The NOx trap band 82 is wash coated or embedded with the appropriate chemicals, such as barium oxide, which are suitable for NOx trap regeneration. This separate NOx trap member 82 is affixed to the downstream surface 24 of the filter media 62. Thus, the NOx trap 82 is positioned in close proximity to the filter media 62. As a result, the NOx trap 82 is indirectly exposed to the radiation emitted by the heat electrically generated via interconnections 64. The NOx trap 82, similar to the wash coat 80 in FIG. 8, is regenerated to purge sulfur due to the exposure to heat due to the close positioning of the NOx trap 82 close to the heat source, namely, the electrically heated filter media 62.

The filter system of the present invention provides an Active Diesel Particulate Filter System (ADPFS) that is characterized by high efficiency and very low electric power consumption for regeneration. The regeneration is independent of engine exhaust temperature or fuel sulfur content. The filter material 62 is made of sintered metal fibers and has high porosity, high soot holding capacity, low thermal mass for quick heating and low back pressure. The metal fibers 62 are designed to resist corrosion at high temperatures. This filter material is capable of capturing up to 95% of the soot in diesel exhaust.

The operation of the ADPFS is controlled by a microprocessor. The controller monitors the ADPFS and periodically, as required, an electric current is passed through a filter element 62, which then acts as a heating element. The filter elements are stacked to form a filter cartridge 10. In a typical system, two or more filter cartridges are used. During regeneration cycle, the exhaust flow is controlled by redirecting the flow away from the filter element that is been heated. This is done to minimize the energy consumption during regeneration. The regeneration strategy is designed to keep the back pressure below a preset level.

The ADPFS functions automatically, during normal engine operation. It is scalable from 15 to 1000 HP engines, and can be used in any application, stationary or mobile. In addition, for example, engines up to 2000 HP may be accommodated. The ADPFS can be combined with a Diesel oxidation catalyst to further suppress the carbon monoxide, hydrocarbons and the soluble organic fraction of the particulate matter.

A typical 160 HP diesel engine uses 32 filter elements, each of which is regenerated at one time in less than one minute. To regenerate the NOx trap does not require additional energy over the PM regeneration which makes the entire system very energy efficient with an approximate 1.0 to 3.0% total fuel penalty.

In operation, further to what is shown in FIGS. 3 and 4, additional customization and control of the electrical regeneration and cleaning of each of the filter media members 16 can be achieved by further control of the sub-cartridges 60 therein. For example, when a given damper plate 20 is closed for a filter media member, it is possible for the electronic computer control module 40 to be programmed so that all of the sub-cartridges 60 within a given filter media member 16 regenerate and are cleaned at the same time. Alternatively, the sub-cartridges 60 may be electrically regenerated and be cleaned one at a time depending on the requirements of the particular vehicle in which the system is installed.

The filter cartridge system 10 of the present invention is unique in that there is complete programmable control of every aspect of the electrical regeneration and cleaning of the filter media members 16 and sub-cartridges 16 therein. As a result, the filter cartridge system 10 of the present invention provides filtration efficiency that cannot be achieved in the prior art. The NOx traps 80 and 82, respectively, may be simultaneously regenerated along with the filter media members 16 to provide a filter system with an integrated NOx trap. The programming of the flow of exhaust can be easily controlled to address the relative needs of the filtration of particulate as well as nitrogen oxide to suit the needs of the application at hand.

In accordance with the present invention, it is preferred that the housing components, including the main sleeve 42, import port 50 and top cap 48 are all made of metal but may be made if other materials such as ceramic, when desired. Further the filter support plate 12 and central mounting tube 28 as well as the support base 38 for the computer control module 40 are also preferably made of metal for resistance to wear. Known electronic computer control modules 40 and other programmable logic arrays (PLAs) are suitable for use in the present invention. Also, solenoid-type pistons 32 are preferably used to drive the damper plates 36 into communication with the apertures 14 on the filter support plate 12; however, other types of mechanisms may be employed for actuating the damper plates 36.

Also, the filter media members 16 are preferably made of inorganic filter material and electrically resistive metal filter strips affixed thereto (not shown). Electricity is supplied to the metal filter strips which heat up and burn off the particulate matter collected in the inorganic filter material. Details of such an electrically regenerable filter media construction are well known in the art and need not be discussed in detail herein.

It would be appreciated by those skilled in the art that various changes and modifications can be made to the illustrated embodiments without departing from the spirit of the present invention. All such modifications and changes are intended to be covered by the appended claims.

What is claimed is:

1. A Diesel particulate filter cartridge system for filtering particulate matter from a flow of air containing particular matter, comprising:
    a filter media stack; including a plurality of sub-cartridges of electrically conductive sintered metal filter fiber; each of said sub-cartridges being independently electrically regenerable;
    means for passing air, with particulate matter therein, through each of said plurality of sub-cartridges;
    means for selectively limiting air passage through stack;
    means for selectively passing electricity through each of said sub-cartridges; and
    means for electrically regenerating said at least one of said sub-cartridges when said air passage therethrough is limited.

2. The Diesel particulate filter cartridge system of claim 1, further comprising:
    an outer housing having an input port and an output port; said outer housing being disposed about said filter media stack, said means for passing air, means for selectively limiting air passage and said means for electrically regenerating; said input port of said housing being in fluid communication with said upstream side of said sub-cartridges and said output port being in fluid communication with said downstream side of said sub-cartridges.

3. The Diesel particulate filter cartridge system of claim 1, wherein said means for selectively limiting air passage is a plurality of damper valves.

4. The Diesel particulate filter cartridge system of claim 3, wherein said damper valves are electrically controlled.

5. The Diesel particulate filter cartridge system of claim 3, wherein said damper valves are pneumatically controlled.

6. The Diesel particulate filter cartridge system of claim 1, further comprising:
    a computer control module electrically connected to said filter media stack and said means for selectively limiting air passage through said filter media stack; said computer control module selectively controlling flow of air through said filter media stack and electrical regeneration of sub-cartridges therein.

7. The Diesel particulate filter cartridge system of claim 1, further comprising:
    a wash coat of nitrogen oxide trapping chemical applied to said sub-cartridges.

8. The Diesel particulate filter cartridge system of claim 7, wherein said wash coat is barium oxide.

9. The Diesel particulate filter cartridge system of claim 2, further comprising:
    a plurality of layers of NOx trap members respectively disposed in close proximity to said sub-cartridges; said NOx trap members carrying a nitrogen oxide trapping chemical and being made of electrically conductive sintered metal filter fiber.

10. The Diesel particulate filter cartridge system of claim 9, wherein said nitrogen oxide trapping chemical is barium oxide.

11. A Diesel particulate filter cartridge system for filtering particulate matter from a flow of air containing particular matter, comprising:
    a support plate having a plurality of through holes;
    a plurality of cylindrical filter media stacks, each having a bottom closed end and a top open end; said cylindrical configuration having an outer surface; said top open end of each of said filter media stacks being connected to said support plate with said top open end of each of said filter media stacks in respective fluid communication with said plurality of through holes; each of said filter media stacks including a plurality of sub-cartridges, each of said sub-cartridges being independently electrically regenerable;
    a valve assembly mounted to said support plate; said valve assembly including a plurality of damper valves respectively corresponding to each of said plurality of through holes; each of said damper valves being independently actuatable into communication with respective through holes of said support plate; said damper valves limiting flow of air through a corresponding through hole and filter media stack connected thereto; and
    an outer housing having an input port and an output port; said outer housing being disposed about said support plate, said filter media stacks and said valve assembly.

12. The Diesel particulate filter cartridge system of claim 11, wherein said damper valves are electrically controlled.

13. The Diesel particulate filter cartridge system of claim 11, wherein said damper valves are pneumatically controlled.

14. The Diesel particulate filter cartridge system of claim 11, wherein said damper valves include a damper plate connected to an actuatable post.

15. The Diesel particulate filter cartridge system of claim 14, wherein said post is controllably actuated by a piston.

16. The Diesel particulate filter cartridge system of claim 11, further comprising:
    a computer control module electrically connected to said plurality of filter media stacks and said plurality of damper valves; said computer control module selectively controlling flow of air through said filter media stacks and electrical regeneration of sub-cartridges therein.

17. A method of filtering particulate matter from a flow of air, comprising:
    providing a filter support plate having a plurality of through holes;
    providing a plurality of cylindrical filter media stacks, each having a bottom closed end and a top open end and including a plurality of independently electrically regenerable sub-cartridges of electrically conductive sintered metal filter fiber; said top open end of each of said filter media stacks being connected to said filter support plate with said top open end of each of said filter media stacks in respective fluid communication with said plurality of through holes; said filter media members being selectively electrically regenerable;
    providing a valve assembly mounted to said filter support plate; said valve assembly including a plurality of damper valves respectively corresponding to each of said plurality of through holes; each of said damper valves being independently actuatable into communication with respective through holes of said filter support plate; said damper valves limiting flow of air through a corresponding through hole and filter media stack connected thereto;

passing air, containing particulate matter therein, through said filter media stacks;

collecting particulate matter in said sub-cartridges of said filter media stacks;

actuating one of said damper valves into communication with its corresponding through hole thereby reducing flow of air through a corresponding filter media stack connected thereto;

selectively passing electricity through said sub-cartridges of said filter media stack with reduced airflow therethrough;

regenerating said sub-cartridges with reduced air flow therethrough; and actuating said one of said damper valves out of communication with its corresponding through hole thereby allowing full flow of air through a corresponding filter media stack connected thereto.

18. The method of claim 17, further comprising the steps of:

actuating a plurality of said damper valves into communication with corresponding through holes thereby reducing flow of air through corresponding filter media stacks connected thereto;

selectively passing electricity through said sub-cartridges of said filter media stacks with reduced airflow therethrough;

regenerating said sub-cartridges with reduced air flow therethrough; and actuating said plurality of said damper valves out of communication with the corresponding through holes thereby allowing full flow of air through corresponding filter media stacks connected thereto.

19. The method of claim 17, further comprising the steps of:

providing a computer control module electrically connected to said plurality of filter media stacks and said plurality of damper valves; and selectively controlling flow of air through said filter media stacks and electrical regeneration thereof via said computer control module.

20. The method of claim 17, further comprising the steps of:

providing a wash coat of nitrogen oxide trapping chemical on each of said sub-cartridges;

directly heating said nitrogen oxide trapping chemical during electrical regeneration of said sub-cartridges;

purging said sub-cartridges of sulfur trapped thereon.

21. The method of claim 20, wherein said nitrogen trapping chemical is barium oxide.

22. The method of claim 17, further comprising the steps of:

providing a NOx trap member in close proximity to said sub-cartridges;

applying a nitrogen trapping chemical to said NOx trap member;

indirectly heating said NOx trap during electrical regeneration of said sub-cartridges;

purging said sub-cartridges of sulfur trapped thereon.

23. The method of claim 22, wherein said nitrogen trapping chemical is barium oxide.

* * * * *